(12) United States Patent
Hoshide et al.

(10) Patent No.: US 10,662,999 B2
(45) Date of Patent: May 26, 2020

(54) MOBILE-OBJECT-HOLDING TOOL AND MOBILE OBJECT

(71) Applicant: THK CO., LTD., Tokyo (JP)

(72) Inventors: Kaoru Hoshide, Tokyo (JP); Katsuya Iida, Tokyo (JP); Soshi Miyahara, Tokyo (JP); Masakazu Takahashi, Tokyo (JP); Shigeo Tomita, Tokyo (JP)

(73) Assignee: THK CO., LTD., Tokyo (JP)

(*) Notice: Subject to any disclaimer, the term of this patent is extended or adjusted under 35 U.S.C. 154(b) by 0 days.

(21) Appl. No.: 16/322,573

(22) PCT Filed: Aug. 2, 2017

(86) PCT No.: PCT/JP2017/028042
§ 371 (c)(1),
(2) Date: Feb. 1, 2019

(87) PCT Pub. No.: WO2018/030234
PCT Pub. Date: Feb. 15, 2018

(65) Prior Publication Data
US 2019/0170189 A1 Jun. 6, 2019

(30) Foreign Application Priority Data

Aug. 8, 2016 (JP) .................................. 2016-155678
Jul. 7, 2017 (JP) .................................. 2017-134012

(51) Int. Cl.
*F16C 29/06* (2006.01)
*F16C 41/04* (2006.01)
*F16C 29/12* (2006.01)

(52) U.S. Cl.
CPC ............ *F16C 29/06* (2013.01); *F16C 29/123* (2013.01); *F16C 41/04* (2013.01)

(58) Field of Classification Search
CPC .................................. F16C 41/04; F16C 29/06
(Continued)

(56) References Cited

U.S. PATENT DOCUMENTS 6,158,890 A * 12/2000 Hattori ................ F16C 29/0647
384/45
7,445,386 B2 * 11/2008 Chen ................... F16C 29/0647
384/45
(Continued)

FOREIGN PATENT DOCUMENTS

CN 86 1 00128 A 7/1986
CN 1105109 A 7/1995
(Continued)

OTHER PUBLICATIONS

Machine Translation of JP2015-075226.*
(Continued)

*Primary Examiner* — Marcus Charles
(74) *Attorney, Agent, or Firm* — Westerman, Hattori, Daniels & Adrian, LLP

(57) ABSTRACT

This mobile-object-holding tool is mounted in place of a track body on a mobile object which moves along the track body, wherein the mobile object includes at least a pair of rolling element load rolling grooves through which a plurality of rolling elements roll and the mobile-object-holding tool includes a pair of holding parts which face the pair of rolling element load rolling grooves and hold the plurality of rolling elements, a biasing linking part which links the pair of holding parts together and biases the pair of holding parts away from each other, and a deformation regulating part which regulates a mounted contraction amount by which the biasing linking part is capable of contracting after being mounted on the mobile object to a predetermined value or less.

10 Claims, 15 Drawing Sheets

(58) Field of Classification Search
USPC .......................................... 384/7, 23, 41, 49
See application file for complete search history.

(56) References Cited

U.S. PATENT DOCUMENTS 7,670,053 B2 * 3/2010 Lin ..................... F16C 29/0647
                                                                  384/45
2008/0069486 A1    3/2008 Chen

FOREIGN PATENT DOCUMENTS

| CN | 1197505 A    | 10/1998 |
|----|--------------|---------|
| EP | 1 179 384 A2 | 2/2002  |
| EP | 1 245 958 A2 | 10/2002 |
| JP | 3121911 U    | 6/2006  |
| JP | 4398970 B2   | 1/2010  |
| JP | 2015-75226 A | 4/2015  |
| WO | 98/58762 A1  | 12/1998 |

OTHER PUBLICATIONS

International Search Report dated Sep. 12, 2017, issued in counterpart International Application No. PCT/JP2017/028042, w/English translation (3 pages).
Office Action, dated Oct. 11, 2019, issued in Chinese Application No. 201780046744.9 (w/ partial English translation; 11 pages).

* cited by examiner

MOBILE-OBJECT-HOLDING TOOL AND MOBILE OBJECT

TECHNICAL FIELD

The present invention relates to a mobile-object-holding tool and a mobile object.

The present application claims priority based on. Japanese Patent Application No. 2016-155678 filed on Aug. 8, 2016 and Japanese Patent Application No. 2017-134012 filed on Jul. 7, 2017, the contents of which are incorporated herein by reference

BACKGROUND ART

As an example of a mobile-object-holding tool mounted in place of a track body on a mobile object which moves along the track body, Patent Document 1 describes a ball slideway mounted on a linear guideway (slider block).

This ball slideway has a constitution in which a pair of holding parts which hold balls and a U-shaped type elastic piece which biases the pair of holding parts away from each other are provided and the separation from the linear guideway is prevented by compression when it is mounted on the linear guideway.

RELATED ART DOCUMENT

Patent Document

Patent Document 1: Japanese Patent No. 4398970

SUMMARY

Problems to be Solved by the Invention

Incidentally, the mobile-object-holding tool is mounted on the mobile object for the purpose of holding rolling elements while the mobile object is attached to the track body. For this reason, for example, a case in which the mobile-object-holding tool is used as an inserting jig by which the mobile object is attached to the track body, which is not a case in which the mobile-object-holding tool is used for its original purpose, the rolling element is likely to be separated due to an excessive load applied to the mobile-object-holding tool.

An aspect of the present invention was made in view of the above-described problems and an objective of the present invention is to provide the mobile-object-holding tool capable of reliably preventing the separating of the rolling element from the mobile object and the mobile object including the same.

Means for Solving the Problem

In order to solve the above-described problems, a mobile-object-holding tool according to a first aspect of the present invention is a mobile-object-holding tool which is mounted in place of a track body on a mobile object which moves along the track body, wherein the mobile object includes at least a pair of rolling element load rolling grooves through which a plurality of rolling elements roll and the mobile-object-holding tool includes a pair of holding parts which face the pair of rolling element load rolling grooves and hold the plurality of rolling elements, a biasing linking part which links the pair of holding parts together and biases the pair of holding parts away from each other, and a deformation regulating part which regulates a mounted contraction amount by which the biasing linking part is capable of contracting after being mounted on the mobile object to a predetermined value or less.

Also, a mobile object according to a second aspect of the present invention is a mobile object which moves along a track body, wherein the mobile-object-holding tool described above is mounted in place of the track body.

Advantage of the Invention

According to an aspect of the present invention, a mobile-object-bolding tool capable of reliably preventing the separating of a rolling element from a mobile object and a mobile object including the same can be obtained.

DESCRIPTION OF THE EMBODIMENTS

Figure 1:
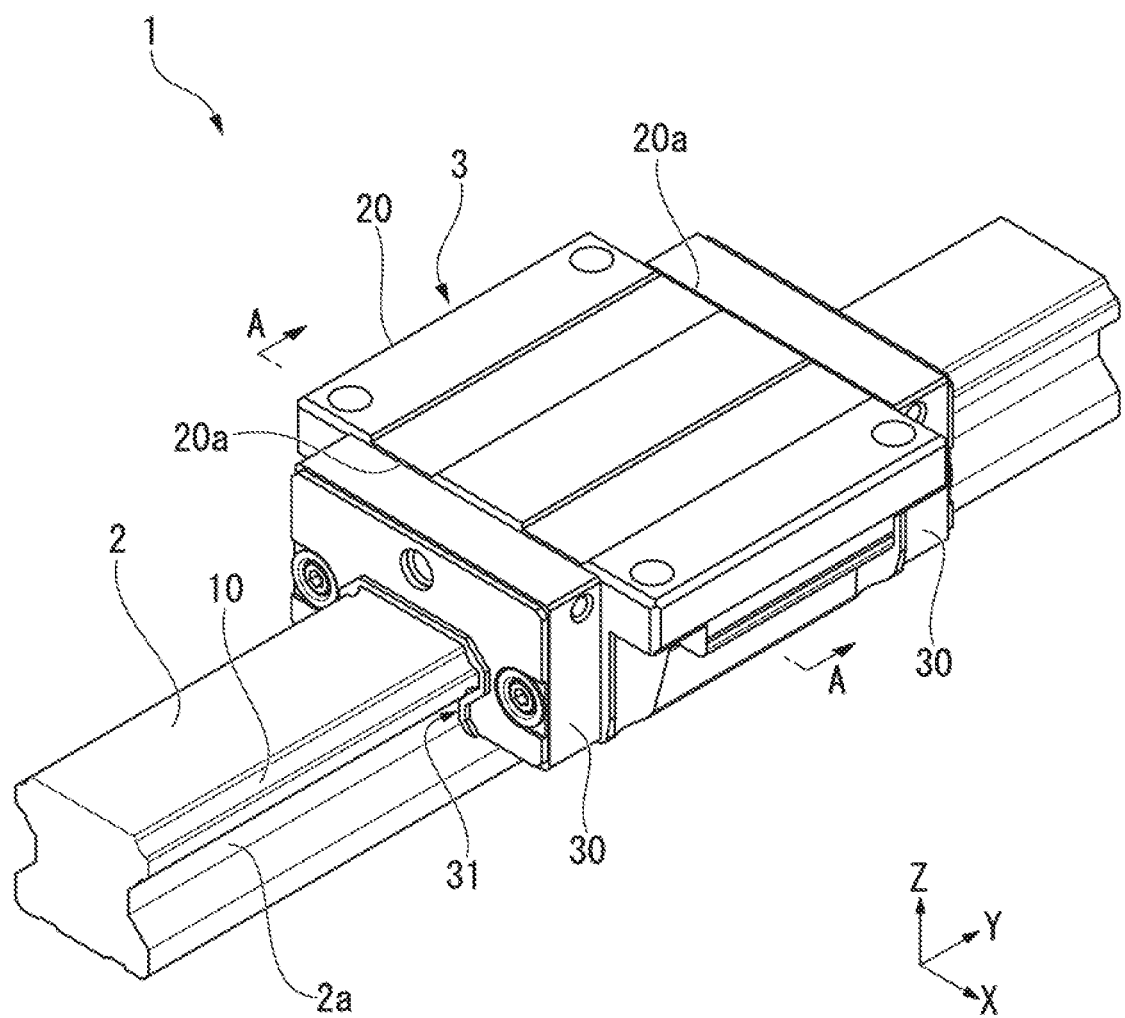
FIG. 1 is a perspective view showing a linear guide according to a first embodiment of the present invention.

Embodiments of the present invention will be described below with reference to the drawings. In the following description, an aspect in which the present invention is applied to a linear guide (motion guide device) in which a slider block moves along a track rail will be exemplified. In order to better understand the gist of the invention, the following embodiments are explained as examples and do not limit the present invention unless otherwise stated. Furthermore, in the drawings used in the following description, in order to facilitate the understanding of the features of the present invention, portions that are main parts are enlarged in some cases for the sake of convenience and dimensional ratios of the components are not necessarily actual size. In addition, in order to facilitate the understanding of the features of the present invention, some parts are omitted for the sake of convenience.

First Embodiment

Figure 2:
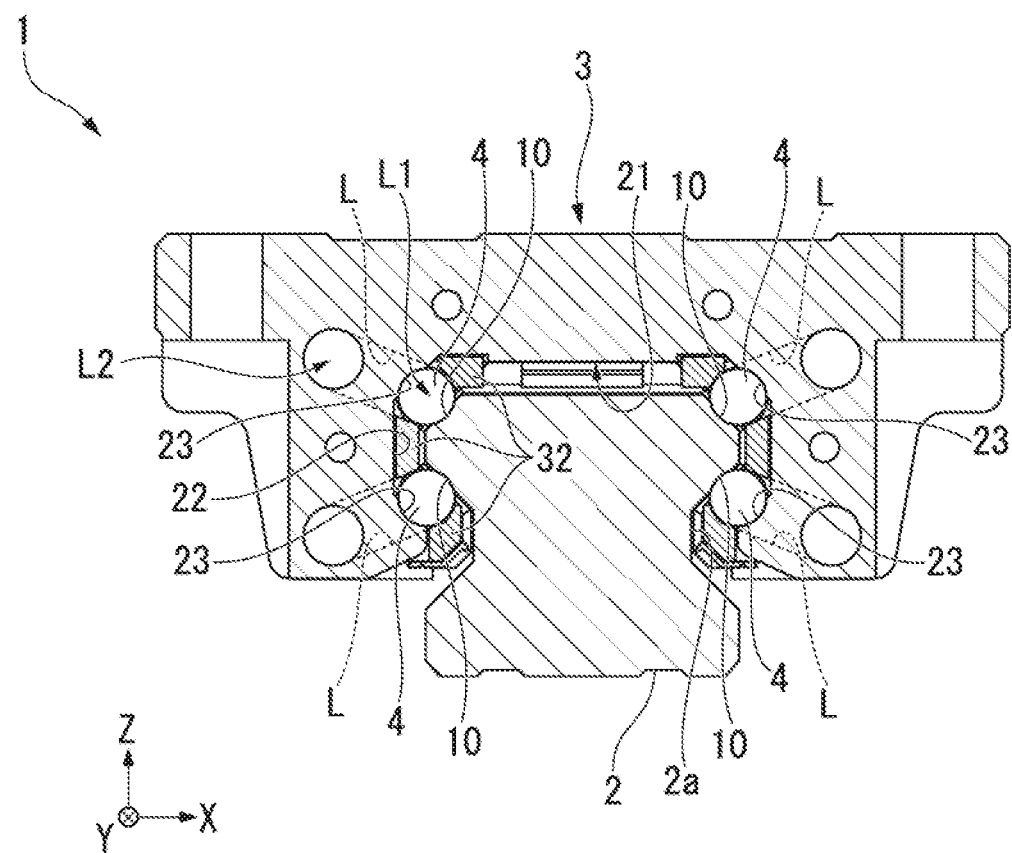
FIG. 2 is a cross-sectional view taken along line A-A in FIG. 1.

FIG. 1 is a perspective view showing a linear guide 1 according to a first embodiment of the present invention. FIG. 2 is a cross-sectional view taken along line A-A in FIG. 1.

As illustrated in FIGS. 1 and 2, the linear guide 1 includes a track rail 2 (track body), a slider block 3 (mobile object), and a plurality of balls 4 (rolling elements).

It should be noted that, in the following description, an XYZ orthogonal coordinate system is set, and positional relationships between parts will be described with reference to the XYZ orthogonal coordinate system in some cases. A width direction of the track rail 2 is defined as an X axis direction, a longitudinal direction of the track rail 2 is defined as a Y axis direction, and a direction orthogonal to the X axis direction and the Y axis direction (that is, a thickness direction of the track rail 2) is defined as a Z axis direction.

The track rail 2 is an elongated member with a substantially rectangular shape in a cross-sectional view. An outer side surface 2a in the width direction (Y axis direction) of the track rail 2 has a central portion recessed in the thickness direction (Z axis direction). A relatively protruding portion is formed above the recessed portion and rolling element rolling grooves 10 are formed in the protruding portion in the Y axis direction. As illustrated in FIG. 2, the rolling element rolling grooves 10 are formed above and below the protruding portion and two pairs of rolling element rolling grooves 10, that is, a total of four rolling element rolling grooves 10, are formed on the right and left of the track rail 2.

As illustrated in FIG. 1, the slider block 3 includes a block main body 20 and lid bodies 30 attached to both end surfaces 20a of the block main body 20.

As illustrated in FIG. 2, the block main body 20 is formed in substantially a C shape in a cross-sectional view. The block main body 20 includes a rail accommodation part 21 which accommodates the track rail 2. The rail accommodation part 21 opens to a bottom surface of the block main body 20 and is formed in a longitudinal direction (Y axis direction) of the block main body 20.

The rail accommodation part 21 is formed to have a protruding portion that faces the recessed portion of the outer side surface 2a in the track rail 2. Rolling element load rolling grooves 23 are formed in an inner surface 22 of the rail accommodation part 21 above the protruding portion. The rolling element load rolling grooves 23 are formed above and below the inner surface 22 which faces the protruding portion of the outer side surface 2a in the track rail 2 and two pairs of the rolling element load rolling grooves 23, that is, a total of four rolling element load rolling grooves 23, are formed on the right and left of the slider block 3 to sandwich the track rail 2. The rolling element load rolling grooves 23 face the rolling element rolling grooves 10 in the track rail 2 and form load rolling element rolling paths L1 along which the balls 4 roll under a loaded condition.

Also, no-load rolling element rolling paths L2 are formed in the block main body 20. The no-load rolling element rolling paths L2 are formed to pass through the block main body 20 in the longitudinal direction (Z axis direction). A constitution in which inner diameters of the no-load rolling element rolling paths L2 are larger than ball diameters of the balls 4 and a load is not applied to the balls 4 is provided. A total of four no-load rolling element rolling paths L2 are formed to correspond to the rolling element load rolling grooves 23 (load rolling element rolling paths L1).

As illustrated in FIG. 1, the lid bodies 30 are attached to both end surfaces 20a of the block main body 20. Like the block main body 20, the lid bodies 30 are formed in substantially a C shape in a cross-sectional view. That is to say, the lid bodies 30 have rail accommodation parts 31 which accommodate the track rail 2. Ball guides 32 illustrated in FIG. 2 hold both sides of the balls 4 which roll in the rolling element load rolling grooves 23. The ball guides 32 are provided along the inner surface 22 of the block main body 20.

In the lid bodies 30, rolling element direction turning paths (not shown) are formed in facing surfaces which face both end surfaces 20a of the block main body 20. A pair of rolling element direction turning paths link both ends of the load rolling element rolling paths L1 and the no-load rolling element rolling paths L2 and form endless circulation paths L (refer to FIG. 2) of the balls 4. The endless circulation paths L are constituted of a pair of linear portions (the load rolling element rolling paths L1 and the no-load rolling element rolling paths L2) extending in the Y axis direction and a pair of semicircular arcuate portions (the rolling element direction turning paths) which link end portions of the pair of linear portions together. In this embodiment, four endless circulation paths L are formed.

The balls 4 are disposed between the track rail 2 and the slider block 3 and cause the slider block 3 to move smoothly on the track rail 2. The balls 4 are ranged inside the endless circulation paths L substantially without gaps and circulate in the endless circulation paths L.

Figure 3:
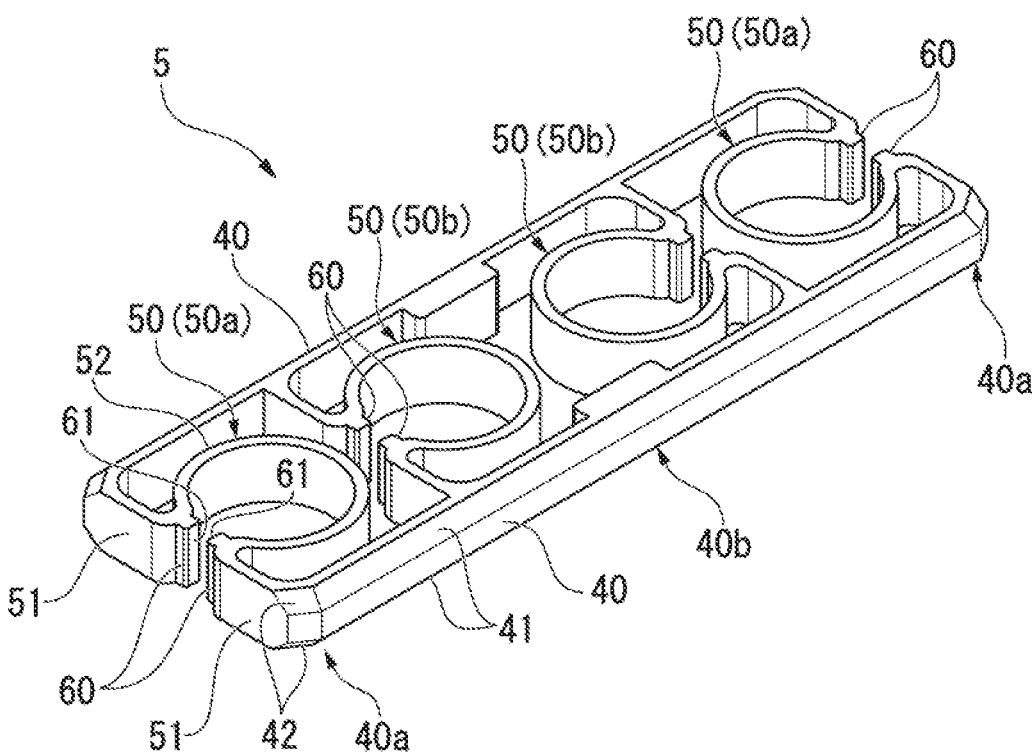
FIG. 3 is a perspective view showing a mobile-object-holding tool according to the first embodiment of the present invention.
Figure 4:
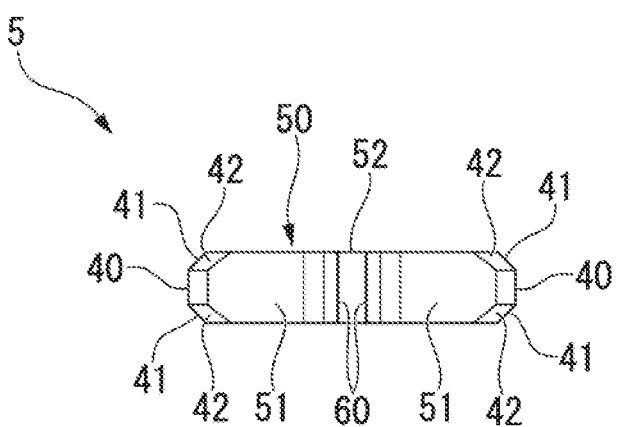
FIG. 4 is a front view showing the mobile-object-holding tool according to the first embodiment of the present invention.
Figure 5:
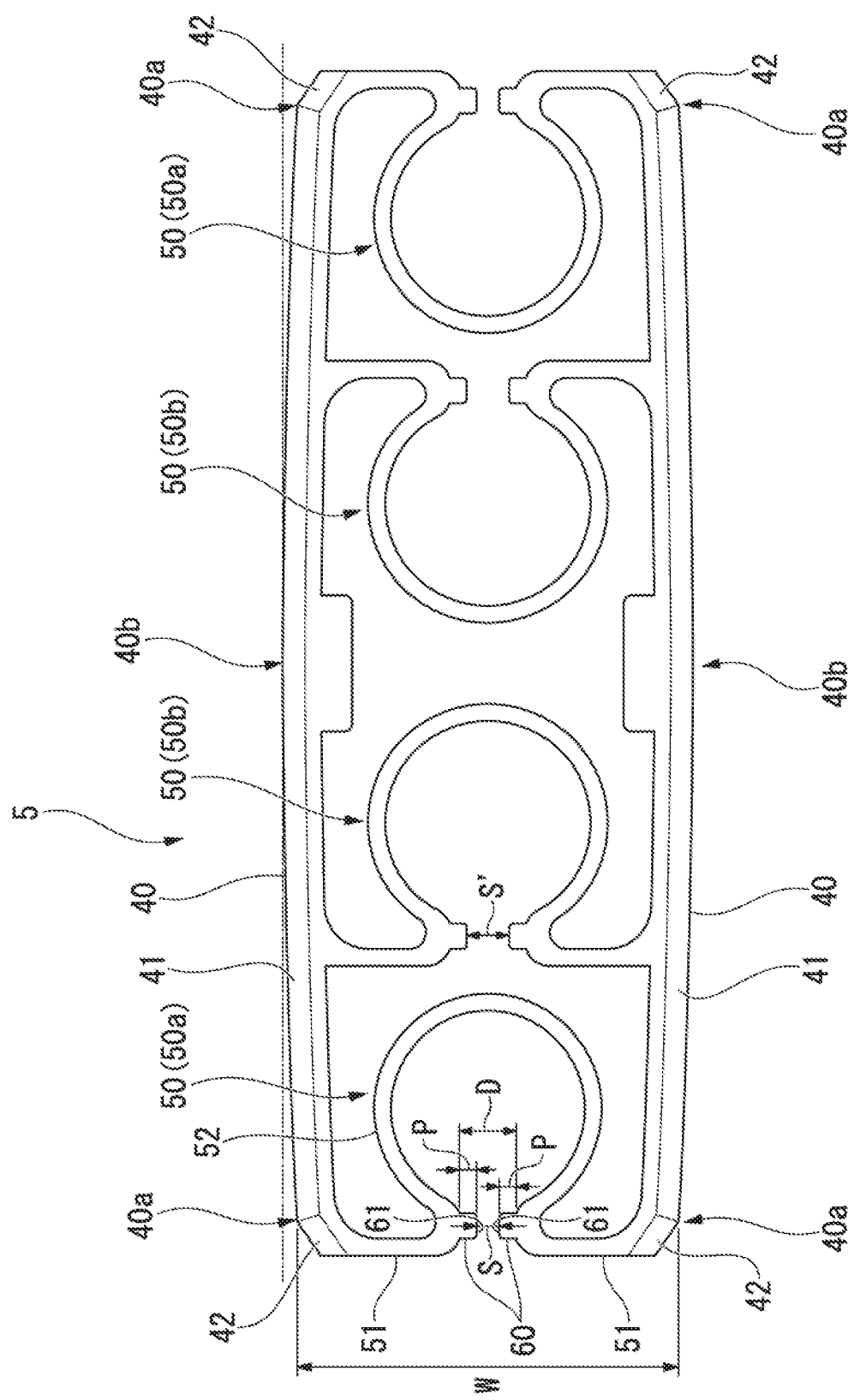
FIG. 5 is a plan view showing the mobile-object-holding tool according to the first embodiment of the present invention.
Figure 6:
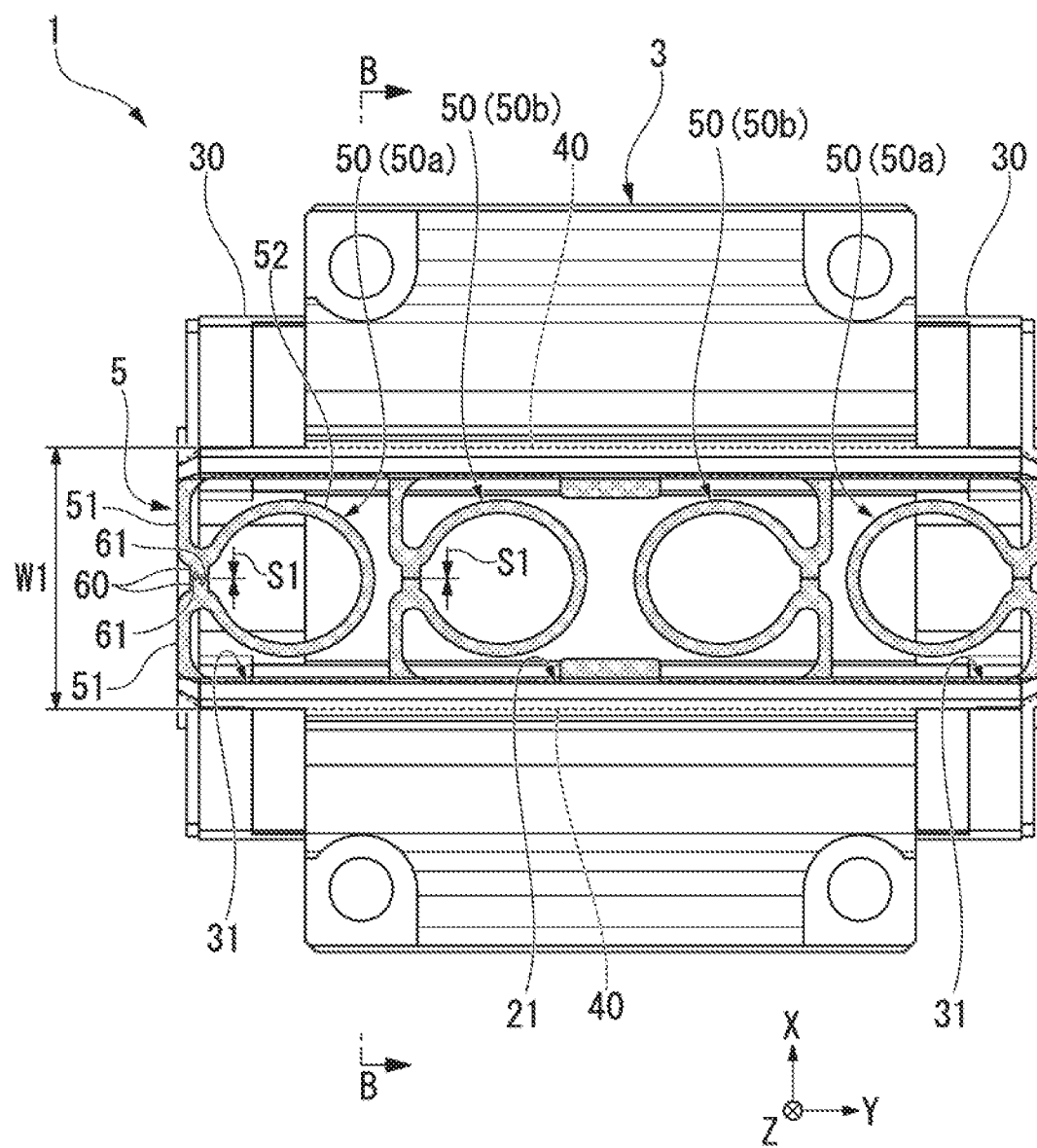
FIG. 6 is a bottom view showing a mobile-object-holding tool 5 mounted on a slider block according to the first embodiment of the present invention.
Figure 7:
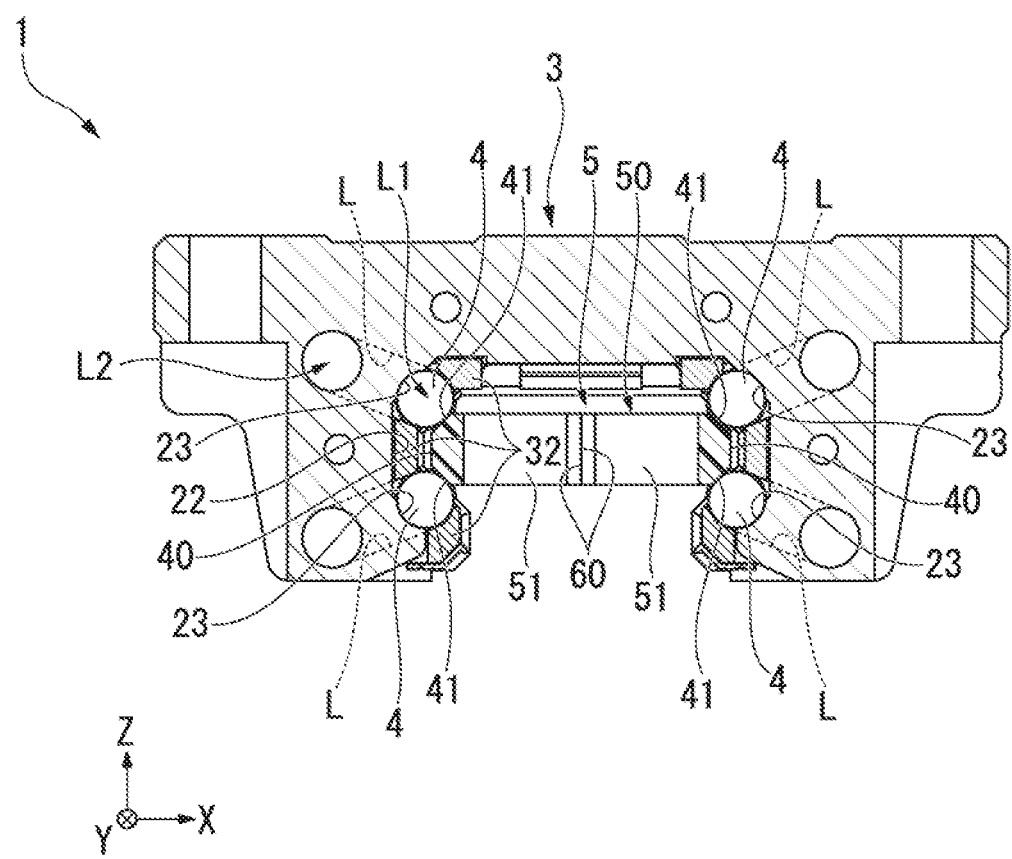
FIG. 7 is a cross-sectional view taken along line B-B in FIG. 6.

FIG. 3 is a perspective view showing a mobile-object-holding tool 5 according to the first embodiment of the present invention. FIG. 4 is a front view showing the mobile-object-holding tool 5 according to the first embodiment of the present invention. FIG. 5 is a plan view showing the mobile-object-holding tool 5 according to the first embodiment of the present invention. FIG. 6 is a bottom view showing a mobile-object-holding tool 5 mounted on the slider block 3 according to the first embodiment of the present invention. FIG. 7 is a cross-sectional view taken along line B-B in FIG. 6.

The mobile-object-holding tool 5 is mounted in place of the track rail 2 on the rail accommodation part 21 of the slider block 3.

The mobile-object-holding tool 5 is used when the slider block 3 is transported as a single body, when the slider block 3 is mounted (assembled) on or separated (disassembled) from the track rail 2, and the like. During such transportation, assembling, and disassembling, the balls 4 are likely to be separated from the slider block 3. During transportation, assembling, and disassembling, the mobile-object-holding tool 5 is mounted in place of the track rail 2 on the slider block 3, which prevents the ball 4 from being separated from the slider block 3.

It is desirable that the mobile-object-holding tool 5 be formed of a member capable of being elastically deformed, for example, a resin molded article. Furthermore, it is desirable that the mobile-object-holding tool 5 be formed of a relatively hard resin material among resin molded articles. As illustrated in FIG. 3, the mobile-object-holding tool 5 includes a pair of holding parts 40, biasing linking parts 50 which link the pair of holding parts 40 together, and deformation regulating parts 60 which regulate the deformation due to the biasing linking parts 50 in a certain range. The pair of holding parts 40, the biasing linking parts 50, and the deformation regulating parts 60 are integrally molded.

As illustrated in FIG. 6, the pair of holding parts 40 are formed to have substantially the same length as the slider block 3 in the Y axis direction. As illustrated in FIG. 7, the pair of holding parts 40 have rolling element holding surfaces 41 which face the rolling element load rolling grooves 23. The rolling element holding surfaces 41 correspond to the rolling element rolling grooves 10 of the track rail 2. The rolling element holding surfaces 41 are formed above and below the pair of holding parts 40 and two pair of rolling element holding surfaces 41 formed on the left and right, that is, a total of four rolling element holding surfaces 41, are formed. Contact angles of the balls 4 with respect to the rolling element holding surfaces 41 and the rolling element load rolling grooves 23 are set at angles of substantially 45° with respect to an XY plane.

As illustrated in FIG. 5, the pair of holding parts 40 have curved shapes that swell in directions in which central portions 40b in a longitudinal direction thereof are separated from each other. The pair of holding parts 40 are ideally formed in parallel and it is desirable that the entire mobile-object-holding tool 5 contract uniformly in a width direction when mounted on the slider block 3. However, if this is not actually done, the pressure on the central portion 40b tends to be lower than both end portions 40a. For this reason, widths of the central portions 40b in the pair of holding parts 40 are formed to be wider than both end portions 40a. For example, the widths of the central portions 40b may be larger by about several percent to about several dozen percent than a design width W in both end portions 40a.

As illustrated in FIG. 6, the design width W of the pair of holding parts 40 is set wider than a post-installation width W1 after being mounted on the slider block 3 (dimensions in the width direction of the rail accommodation part 21 in the block main body 20 and the rail accommodation parts 31 in the lid bodies 30). As illustrated in FIGS. 3 to 5, inclined surfaces 42 are formed on both end portions 40a in the pair of holding parts 40 and have tapered shapes. Thus, the pair of holding parts 40 are configured to be easily mounted (inserted) on the slider block 3. For example, a minimum width between the inclined surfaces 42 illustrated in FIG. 5 may be smaller than the post-installation width W1 illustrated in FIG. 6.

The biasing linking parts 50 link the pair of holding parts 40 together and bias the pair of holding parts 40 away from each other. As illustrated in FIG. 5, the plurality of (four in this embodiment) biasing linking parts 50 are provided at intervals in a longitudinal direction of the pair of holding parts 40. It should be noted that, among the plurality of biasing linking parts 50, a biasing linking part 50 which links both end portions 40a in the pair of holding parts 40 will be described as a first biasing linking parts 50a and a biasing linking part which links the pair of holding parts 40 inside the first biasing linking parts 50a will be described as a second biasing linking part 50b in some cases.

The biasing linking parts 50 are formed in substantially an Ω shape in a plan view illustrated in FIG. 5. Each of the biasing linking parts 50 includes a pair of protrusion parts 51 and a biasing part 52. The pair of protrusion parts 51 are provided to protrude toward each other from the pair of holding parts 40. That is to say, the pair of protrusion parts 51 are provided to protrude from facing surfaces (inner surfaces) at which the pair of holding parts 40 face each other. The biasing part 52 links the pair of protrusion parts 51. The biasing part 52 biases the pair of holding parts 40 via the pair of protrusion parts 51 by a reaction force when elastic deforming is performed. The biasing part 52 is formed in substantially a C shape in a plan view. It should be noted that the biasing part 52 may be formed in a U shape or a horseshoe shape in a plan view.

As illustrated in FIG. 5, the deformation regulating parts 60 are provided on the pair of protrusion parts 51. The deformation regulating parts 60 are provided to protrude from at least one of the pair of protrusion parts 51 (both sides in this embodiment) toward the other thereof. The deformation regulating parts 60 in this embodiment are provided to protrude toward each other from facing parts in which the pair of protrusion parts 51 face each other. The deformation regulating parts 60 have a pair of abutting parts 61 which come into contact with each other when mounted on the slider block 3 and regulate the contracting of the biasing linking parts 50. The pair of abutting parts 61 are formed in a planar shape and are configured to come into surface contact with each other at a prescribed width.

As illustrated in FIG. 5, each of the deformation regulating parts 60 is configured so that a larger pre-mounting contracting amount S by which the biasing linking part 50 can contract before being mounted on the slider block 3 is secured at each of the central portions 40b than that of both end portions 40a in the longitudinal direction of the pair of holding parts 40. That is to say, since the pair of holding parts 40 have curved shapes that swell in directions in which the central portions 40b in the longitudinal direction thereof are separated from each other, modification margins at the central portions 40b are increased. A pre-mounting contracting amount S' in the second biasing linking parts 50b may be larger by about several percent to about several dozen percent than a difference between widths of the central portions 40b and both end portions 40a, that is, the pre-mounting contracting amount S in each of the first biasing linking parts 50a.

As illustrated in FIG. 6, each of the deformation regulating parts 60 regulates a mounted contraction amount S1 by which the biasing linking part 50 is capable of contracting after being mounted on the slider block 3 to a prescribed value or less. It should be noted that a prescribed value or less includes a mounted contraction amount S1 of zero. That is to say, as illustrated in FIG. 6, a state in which, when the mobile-object-holding tool 5 has been mounted on the slider block 3, the pair of abutting parts 61 come into contact with each other and the contracting of the biasing linking part 50 is regulated (suppressed) is included. Although a design is provided so that all mounted contraction amounts S1 in the deformation regulating parts 60 are zero in this embodiment, for example, a gap may be formed in at least one of the plurality of deformation regulating parts 60.

The deformation regulating part 60 in this embodiment regulates the mounted contraction amount S1 by which the biasing linking part 50 can contract after being mounted on the slider block 3 to a radius of the ball 4 or less. According to this constitution, it is possible to reliably prevent the ball 4 from being separated. That is to say, it is conceivable that when distances between the rolling element load rolling grooves 23 and the rolling element holding surfaces 41 are greater than twice diameters Da of the balls 4, the balls 4 are separated. As in this embodiment, in a case in which the contact angles of the balls 4 with respect to the rolling element load rolling grooves 23 and the rolling element holding surfaces 41 are set to angles of substantially 45° with respect to the XY plane, when the biasing linking part 50 contracts by a radius of each of the balls 4 after being mounted, a maximum distance between each of the rolling element load rolling grooves 23 and each of the rolling element holding surfaces 41 on one of the pair of holding parts 40 is about 1.7 Da. That is to say, a maximum distance between each of the rolling element load rolling grooves 23 and each of the rolling element holding surfaces 41 is a diameter Da of each of the balls 4+a radius (Da/2) of the ball 4÷cos 45° and is smaller than 2 Da. Thus, the ball 4 is not separated. Furthermore, according to this constitution, when a contact angle of the ball 4 with respect to the rolling element load rolling groove 23 and the rolling element holding surface 41 is an angle of about 60° or less with respect to the XY plane, the ball 4 is not separated.

An amount of protrusion P of the deformation regulating part 60 illustrated in FIG. 5 is set by the following Expression (1).

$$P = \frac{1}{2} \cdot (D - (W - W1)) \quad (1)$$

Here, W is a design width of the pair of holding parts 40 illustrated in FIG. 5. Furthermore, W1 is a post-installation width (minimum value) of the pair of holding parts 40 after being mounted on the slider block 3 illustrated in FIG. 6. In addition, D is a distance between the protrusion parts of the pair of protrusion parts 51 illustrated in FIG. 5 (a deformable range when there is no deformation regulating part 60).

As illustrated in FIG. 6, by setting the amount of protrusion P of the deformation regulating part 60 on the basis of the foregoing Expression (1), the mounted contraction amount S1 by which the biasing linking part 50 can contract after being mounted on the slider block 3 can be zero. That is to say, by setting the amount of protrusion P of the deformation regulating part 60 so that a difference between the design width W and the post-installation width W1 of the pair of holding parts 40 is the same as the pre-mounting contracting amount S illustrated in FIG. 5, the mounted contraction amount S1 by which the biasing linking part 50 can contract after being mounted on the slider block 3 can be zero.

Table 1 below illustrates dimensions (mm) of mobile-object-holding tools 5 created in accordance with a size of the slider block 3 in Examples 1 to 3. It should be noted that Da is a ball diameter of the ball 4.

TABLE 1

| | W | W1 | S | Da | S/Da | (mm) D |
|---|---|---|---|---|---|---|
| Example 1 | 15.5 | 14.0 | 1.5 | 3 | 50% | 3 |
| Example 2 | 20.5 | 18.2 | 2.3 | 3.969 | 58% | 3.6 |
| Example 3 | 23.5 | 20.5 | 3 | 4.763 | 63% | 4 |

As illustrated in Table 1, a pre-mounting contracting amount S by which the biasing linking part 50 could contract before being mounted on the slider block 3 was smaller than a ball diameter Da. To be specific, S/Da in Example 1 was 50%, S/Da in Example 2 was 58%, and S/Da in Example 3 was 63%. As a result of using tests in Examples 1 to 3, there was separation of the ball 4 in either case. Therefore, the pre-mounting contracting amount S can be set within a range of 50 to 63% of the ball diameter Da.

Next, an action of the mobile-object-holding tool 5 with the above-described constitution will be described.

As illustrated in FIGS. 6 and 7, when the mobile-object-holding tool 5 is inserted (mounted) into the slider block 3, the mobile-object-holding tool 5 is pressed inward in the width direction to contract (elastically deform). Moreover, when the mobile-object-holding tool 5 is inserted into the slider block 3, the mobile-object-holding tool 5 spreads outward in the width direction (is restored) and is mounted on the rail accommodation part 21 of the block main body 20 and the rail accommodation parts 31 of the lid bodies 30.

When the mobile-object-holding tool 5 is mounted on the slider block 3, the biasing part 52 of the biasing linking part 50 contracts due to elastic deformation and is compressed. Moreover, the pair of holding parts 40 are biased outward in the width direction (X axis direction) of the slider block 3 through the compressed biasing linking part 50. Thus, as illustrated in FIG. 7, the pair of holding parts 40 face the pair of rolling element load rolling grooves 23 formed in the rail accommodation part 21 in the slider block 3 and can hold the plurality of balls 4.

Here, as illustrated in FIG. 6, the mobile-object-holding tool 5 includes the deformation regulating part 60 which regulates the mounted contraction amount S1 by which the biasing linking part 50 can contract after being mounted on the slider block 3 to the radius of the ball 4 or less. According to this constitution, since the mobile-object-holding tool 5 can contract only in a range of a radius of the ball 4 or less when mounted on the slider block 3, the balls 4 are not separated physically from the ball guides 32 even when an excessive load is applied to the mobile-object-holding tool 5. For this reason, it is possible to reliably prevent the ball 4 from be separated from the slider block 3.

The deformation regulating part 60 in this embodiment includes the pair of abutting parts 61 which come into contact with each other and regulate the contracting of the biasing linking part 50 when mounted on the slider block 3. Since the pair of abutting parts 61 regulate (suppress) the contracting in the biasing linking part 50, the mobile-object-holding tool 5 can be caused to function as an inserting jig. For example, when the slider block 3 is inserted into the track rail 2 illustrated in FIG. 1, the slider block 3 having the mobile-object-holding tool 5 mounted thereon is disposed at the end portion in the Y axis direction of the track rail 2. Subsequently, the mobile-object-holding tool 5 and the track rail 2 are disposed on a straight line and an end portion of the mobile-object-holding tool 5 and an end portion of the track rail 2 are engaged with each other. Moreover, the slider block 3 is moved toward the track rail 2 and is transferred from the mobile-object-holding tool 5 to the track rail 2.

Since the mobile-object-holding tool 5 includes the rolling element holding surfaces 41 and a cross-sectional shape of the rolling element holding surfaces 41 is substantially the same as that of the rolling element rolling grooves 10 of the track rail 2, the slider block 3 can smoothly transferred from the mobile-object-holding tool 5 to the track rail 2. Furthermore, in a state in which the pair of abutting parts 61 come into contact with each other and the mobile-object-holding tool 5 is mounted on the slider block 3, the further contracting of this state is regulated. Thus, the separating of the ball 4 from the slider block 3 is reliably prevented without being deformed even when an excessive load is applied at the time of insertion. For this reason, the mobile-object-holding tool 5 can function as an inserting jig for inserting the slider block 3 to the track rail 2.

As illustrated in FIG. 5, the biasing linking parts 50 include the pair of protrusion parts 51 which protrude in directions toward each other from the pair of holding parts 40 and the biasing part 52 which link the pair of protrusion parts 51 together and the deformation regulating parts 60 are provided on the pair of protrusion parts 51. Although the deformation regulating parts 60 may be provided at positions different from the pair of protrusion parts 51 (biasing linking parts 50), when the deformation regulating parts 60 are provided on the pair of protrusion parts 51 in this way, an amount of contracting of the biasing linking parts 50 can be directly managed. Thus, it is possible to reliably prevent the ball 4 from being separated from the slider block 3.

The deformation regulating parts 60 are provided to protrude from at least one of the pair of protrusion parts 51 toward the other. As described above, although the deformation regulating parts 60 may be provided at positions different from the pair of protrusion parts 51 (biasing linking parts 50), when a constitution is provided in this way, an amount of protrusion P of the deformation regulating part 60 increases and an amount of resin to be used at the time of molding increases. On the other hand, when the deformation regulating parts 60 are caused to protrude from the pair of protrusion parts 51 as in this embodiment, the amount of protrusion P has been reduced and the amount of resin to be used has been also reduced. Furthermore, a small amount of processing is required even when the existing mold for molding the mobile-object-holding tool 5 is further processed to add the deformation regulating parts 60.

Also, in this embodiment, the plurality of biasing linking parts 50 are provided at intervals in the longitudinal direction of the pair of holding parts 40 and the deformation regulating parts 60 are provided on the plurality of biasing linking parts 50. In this way, when the deformation regulating parts 60 are provided on the plurality of biasing linking parts 50, an amount of contracting of each of the biasing linking parts 50 can be directly managed. Thus, it is possible to reliably prevent the ball 4 from being separated from the slider block 3.

Also, in this embodiment, the pair of holding parts 40 have curved shapes that swell in directions in which the central portions 40b in the longitudinal direction thereof are separated from each other. Each of the deformation regulating parts 60 is configured so that a larger pre-mounting contracting amount S by which the biasing linking part 50 can contract before mounted on the slider block 3 is secured at each of the central portions 40b than that of both end portions 40a in the longitudinal direction of the pair of holding parts 40. According to this constitution, it is possible to reliably prevent the ball 4 from being separated by increasing the compression at the central portion 40b in which the pressure of the central portion 40b leaks easier than both end portions 40a. Furthermore, since both end portions 40a are relatively thinner than the central portions 40b, both end portions 40a can be easily mounted on the slider block 3.

In this way, according to the above-described embodiment, it is possible to reliably prevent the ball 4 from being separated from the slider block 3 by adopting a constitution of the mobile-object-holding tool 5 mounted in place of the track rail 2 on the slider block 3 moving along the track rail 2, in which the slider block 3 includes at least the pair of rolling element load rolling grooves 23 which sandwich the track rail 2 and along which the plurality of balls 4 roll and the mobile-object-holding tool 5 includes the pair of holding parts 40 which face the pair of rolling element load rolling grooves 23 and hold the plurality of balls 4, the biasing linking parts 50 which link the pair of holding parts 40 together and bias the pair of holding parts 40 in directions in which the pair of holding parts 40 are oriented away from each other, and the deformation regulating parts 60 which regulate the mounted contraction amount S1 by which the biasing linking parts 50 can contract after being mounted on the slider block 3 to the radius of the ball 4 or less.

Figure 8A:
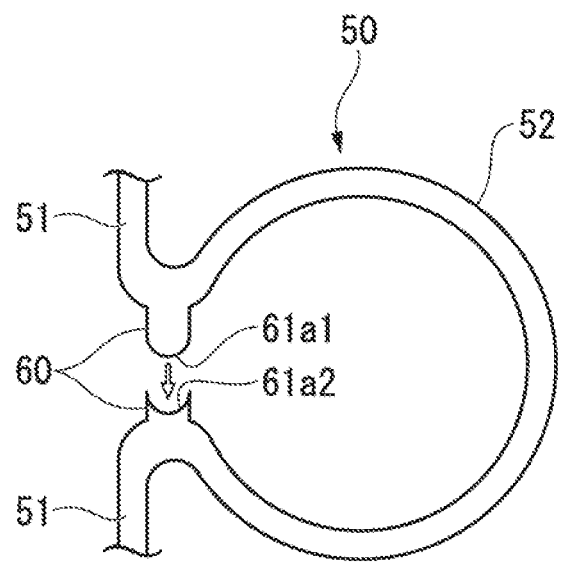
FIG. 8A is an enlarged view showing deformation regulating parts in another aspect of the first embodiment of the present invention.
Figure 8B:
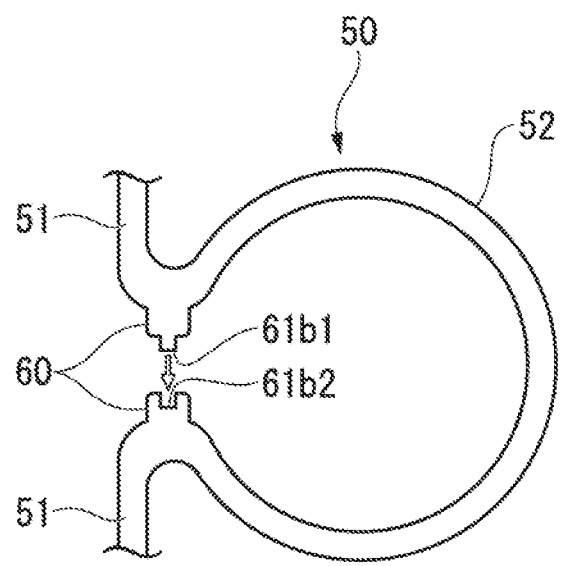
FIG. 8B is an enlarged view showing deformation regulating parts in the other aspect of the first embodiment of the present invention.

Also, in this embodiment, an embodiment as illustrated in FIGS. 8A and 8B can be adopted. It should be noted that, in the following description, constituent elements that are the same as or equal to those of the above-described embodiment will be denoted by the same reference numerals and description thereof will be simplified or omitted.

FIG. 8A is an enlarged view showing deformation regulating parts 60 in another aspect of the first embodiment of the present invention. FIG. 8B is an enlarged view showing deformation regulating parts 60 in the other aspect of the first embodiment of the present invention.

The deformation regulating parts 60 in the other aspect illustrated in FIG. 8A include a pair of abutting parts 61a1 and 61a2 having curved surfaces. One abutting part 61a1 includes a convex curved surface and the other abutting part 61a2 includes a concave curved surface. If both of the pair of abutting parts 61a1 and 61a2 are convex curved surfaces, contact is performed at one point, contact change is easy, and thus a mounted contraction amount S1 changes in some cases, but according to this constitution, the pair of abutting parts 61a and 61a2 come into surface contact with each other. Thus, it is possible to prevent the variation of the mounted contraction amount S1.

The deformation regulating parts 60 in the other aspect illustrated in FIG. 8B include the pair of abutting parts 61b1 and 61b2 having concave and convex portions. One abutting part 61b1 has a convex shape and the other abutting part 61a2 has a concave shape. The convex shape of the abutting part 61b1 and the concave shape of the abutting part 61a2 are formed to have sizes in which the abutting parts can engage with each other. According to this constitution, the concave and convex portions of the pair of abutting parts 61a1 and 61a2 engage with each other. Thus, it is possible to reliably prevent the above-described contact change and prevent the variation of the mounted contraction amount S1.

Second Embodiment

A second embodiment of the present invention will be described below. In the following description, constituent elements that are the same as or equal to the above-described embodiment will be the same reference numerals and description thereof will be simplified or omitted.

Figure 9:
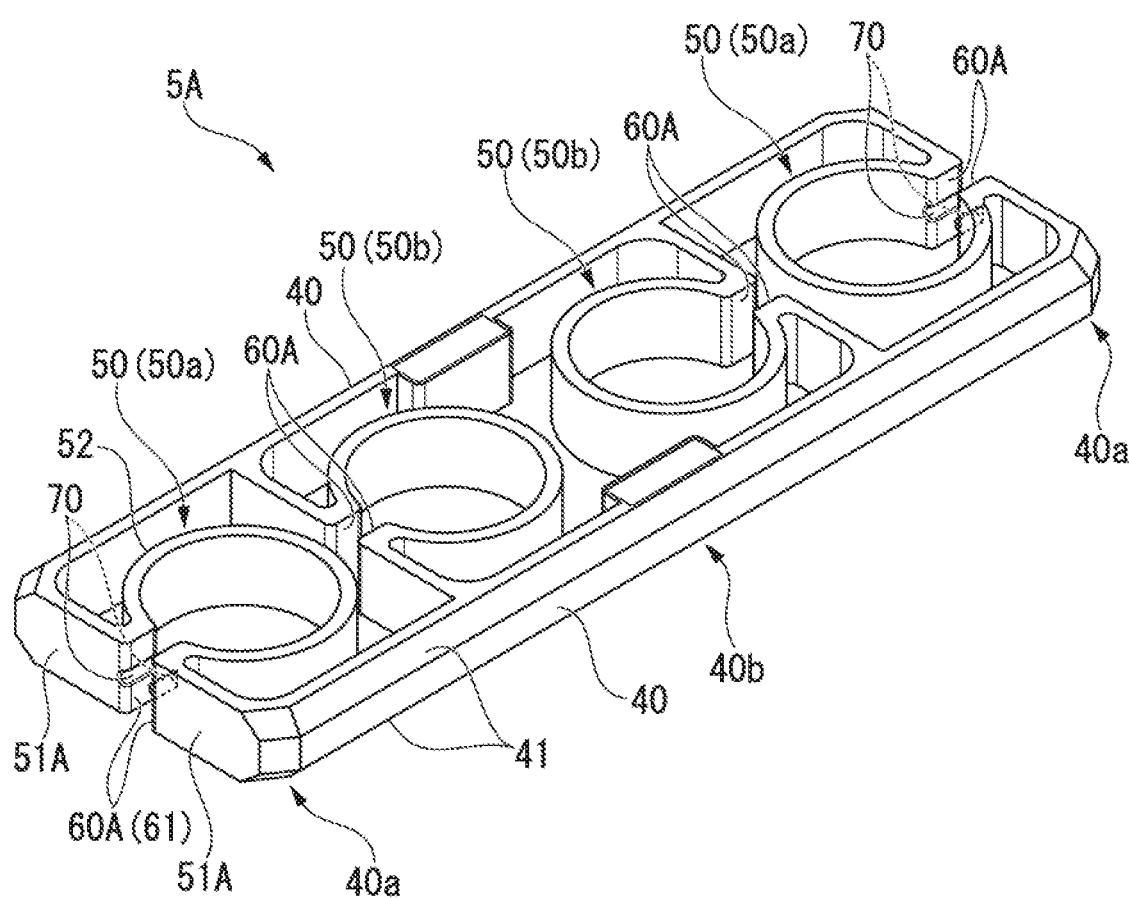
FIG. 9 is a perspective view showing a mobile-object-holding tool according to a second embodiment of the present invention.
Figure 10:
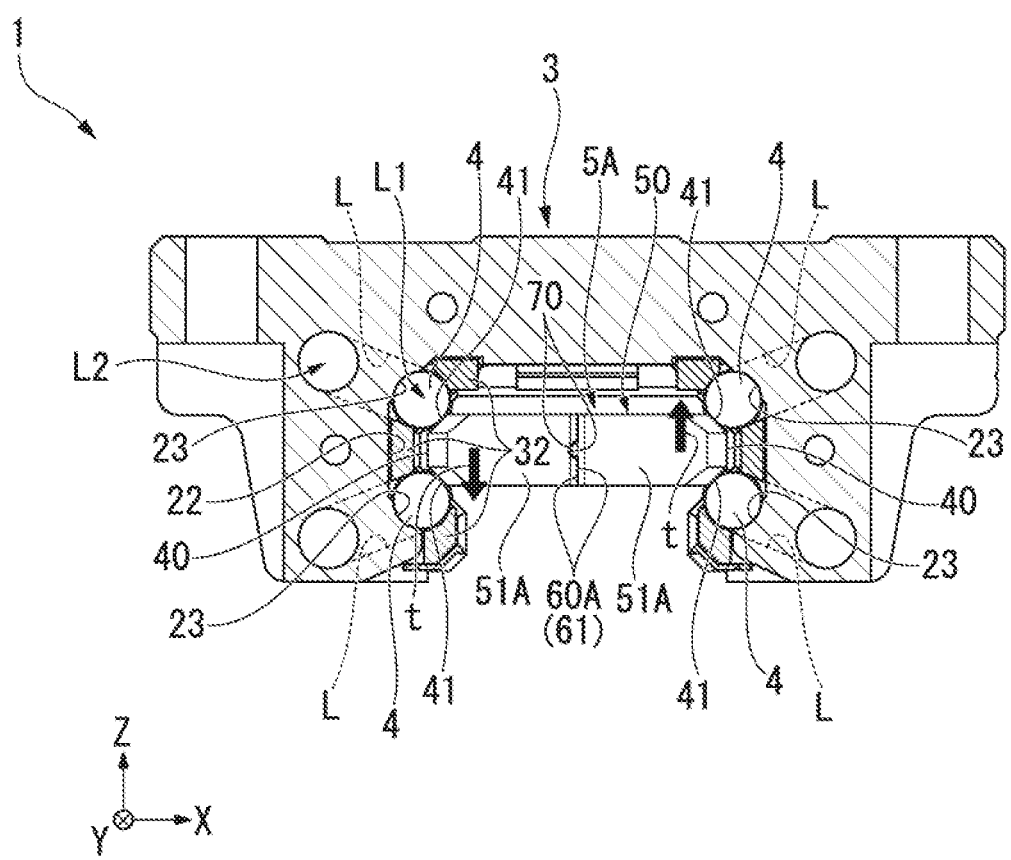
FIG. 10 is a front view showing a state in which the mobile-object-holding tool according to the second embodiment of the present invention is mounted on a slider block.

FIG. 9 is a perspective view showing a mobile-object-holding tool 5A according to the second embodiment of the present invention. FIG. 10 is a front view showing a state in which the mobile-object-holding tool 5A according to the second embodiment of the present invention is mounted on a slider block 3.

As illustrated in FIG. 10, the mobile-object-holding tool 5A in the second embodiment includes a pair of engagement parts 70 which engage each other when mounted on the slider block 3 and regulate the twisting of a pair of holding parts 40 (indicated by a symbol t in FIG. 10).

As illustrated in FIG. 9, the pair of engagement parts 70 are provided on first biasing linking parts 50a which are disposed at at least both end portions 40a in the longitudinal direction of the pair of holding parts 40 among a plurality of biasing linking parts 50. The pair of engagement parts 70 have a concave and convex shape in which the pair of engagement parts 70 extend in the longitudinal direction of the pair of holding parts 40. This concave and convex shape is a semicircular shape in a front view illustrated in FIG. 10. The pair of engagement parts 70 having such a concave and convex shape can be integrally molded through forcible extraction of a metal mold when the mobile-object-holding tool 5A is molded of a resin. It should be noted that, although the pair of engagement parts 70 may be a triangular shape or a quadrangular shape, when the pair of engagement parts 70 is a semicircular shape, the pair of engagement parts 70 can be molded through forcible extraction of a metal mold. Thus, the manufacturing costs are reduced as compared with a case in which the pair of engagement parts 70 is a triangular shape or a quadrangular shape. Furthermore, since there is no corner when the pair of engagement parts 70 is a semicircular shape, there is no concern that a corner breaks even when a strong force is applied.

Deformation regulating parts 60A in the second embodiment are provided on a pair of protrusion parts 51A in the biasing linking parts 50. The deformation regulating parts 60A do not protrude toward each other from the pair of protrusion parts 51A as in the deformation regulating parts 60 in the above-described first embodiment. That is to say, the pair of protrusion parts 51A in the second embodiment approach each other by a dimension (the amount of protrusion P illustrated in FIG. 5) of the deformation regulating parts 60 as compared with the pair of protrusion parts 51 in the above-described first embodiment. In this way, in the second embodiment, the pair of protrusion parts 51A correspond to the deformation regulating parts 60A. As illustrated in FIG. 10, when the mobile-object-holding tool 5A is mounted on the slider block 3, facing parts (corresponding to the abutting parts 61) of the pair of protrusion parts 51A come into contact with each other and regulate (suppress) the contracting of the biasing linking parts 50.

Also, in the second embodiment, as illustrated in FIG. 10, the pair of engagement parts 70 engage each other when mounted on the slider block 3 to regulate (suppress) the twisting of the pair of holding parts 40. The pair of engagement parts 70 are provided on the facing parts of the pair of protrusion parts 51A and engage with each other when mounted on the slider block 3. The pair of engagement parts 70 have a concave and convex shape in which the pair of engagement parts 70 extend in the longitudinal direction (Y axis direction) of the pair of holding parts 40 and come into contact with each other in the thickness direction (Z axis direction) of the pair of holding parts 40. Thus, it is possible to regulate the twisting of the pair of holding parts 40. Therefore, even when an unexpected force is applied to an end surface of the mobile-object-holding tool 5A, it is possible to reliably prevent a ball 4 from being separated from the slider block 3. Furthermore, according to this constitution, it is possible to improve the rigidity against the twisting of the pair of holding parts 40 without impairing the spring property of the biasing linking parts 50.

Also, as illustrated in FIG. 9, the pair of engagement parts 70 is provided on at least the first biasing linking parts 50a disposed at both end portions 40a in the longitudinal direction of the pair of holding parts 40 among the plurality of biasing linking parts 50. When the pair of holding parts 40 are twisted, an amount of displacement in the Z axis direction in the first biasing linking parts 50a (both end portions 40a) is larger than an amount of displacement in the Z axis direction in the second biasing linking parts 50b (central portions 40b). Thus, by providing the pair of engagement parts 70 on the first biasing linking parts 50a, it is possible to effectively prevent the twisting of the pair of holding parts 40. It should be noted that, although the pair of engagement parts 70 may also be provided on the second biasing linking parts 50b, a size of the pair of engagement parts 70 in the second biasing linking parts 50b may be reduced as compared with a size of the pair of engagement parts 70 in the first biasing linking parts 50a.

Figure 11:
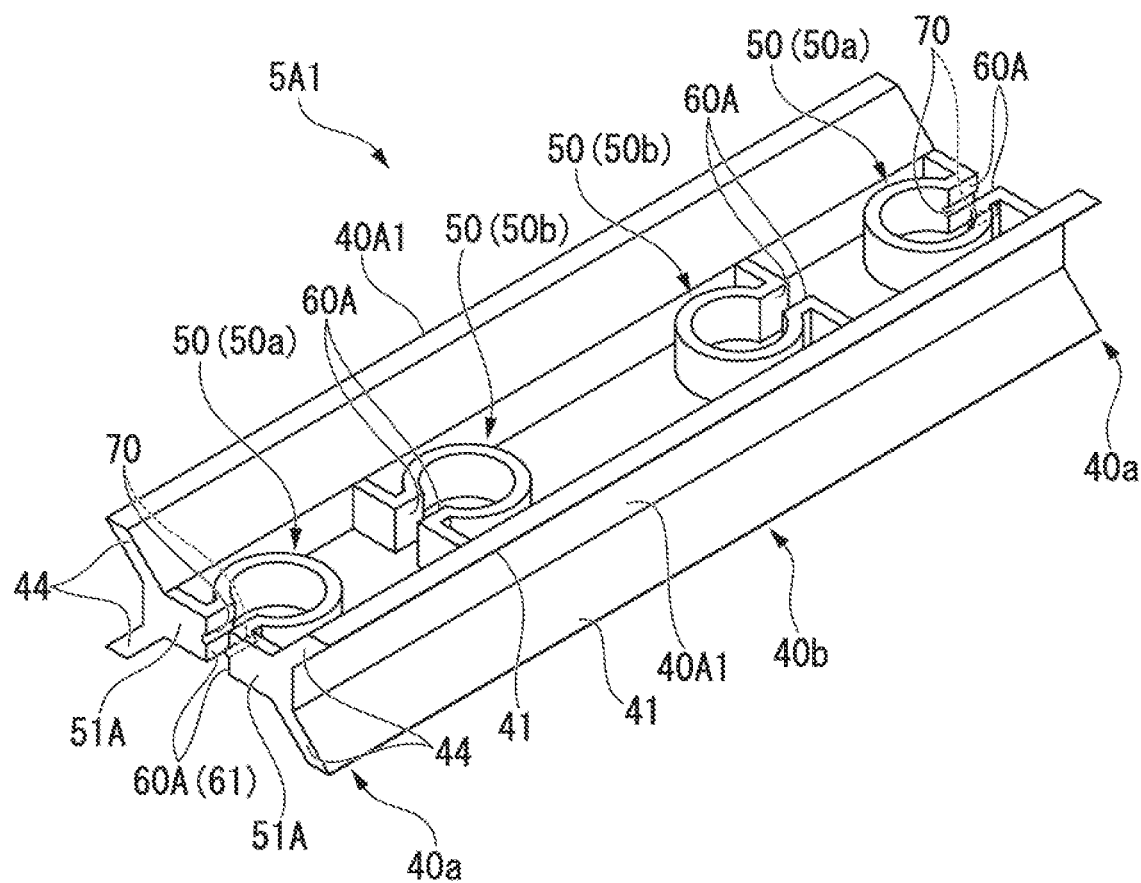
FIG. 11 is a perspective view showing a mobile-object-holding tool in another aspect of the second embodiment of the present invention.
Figure 12:
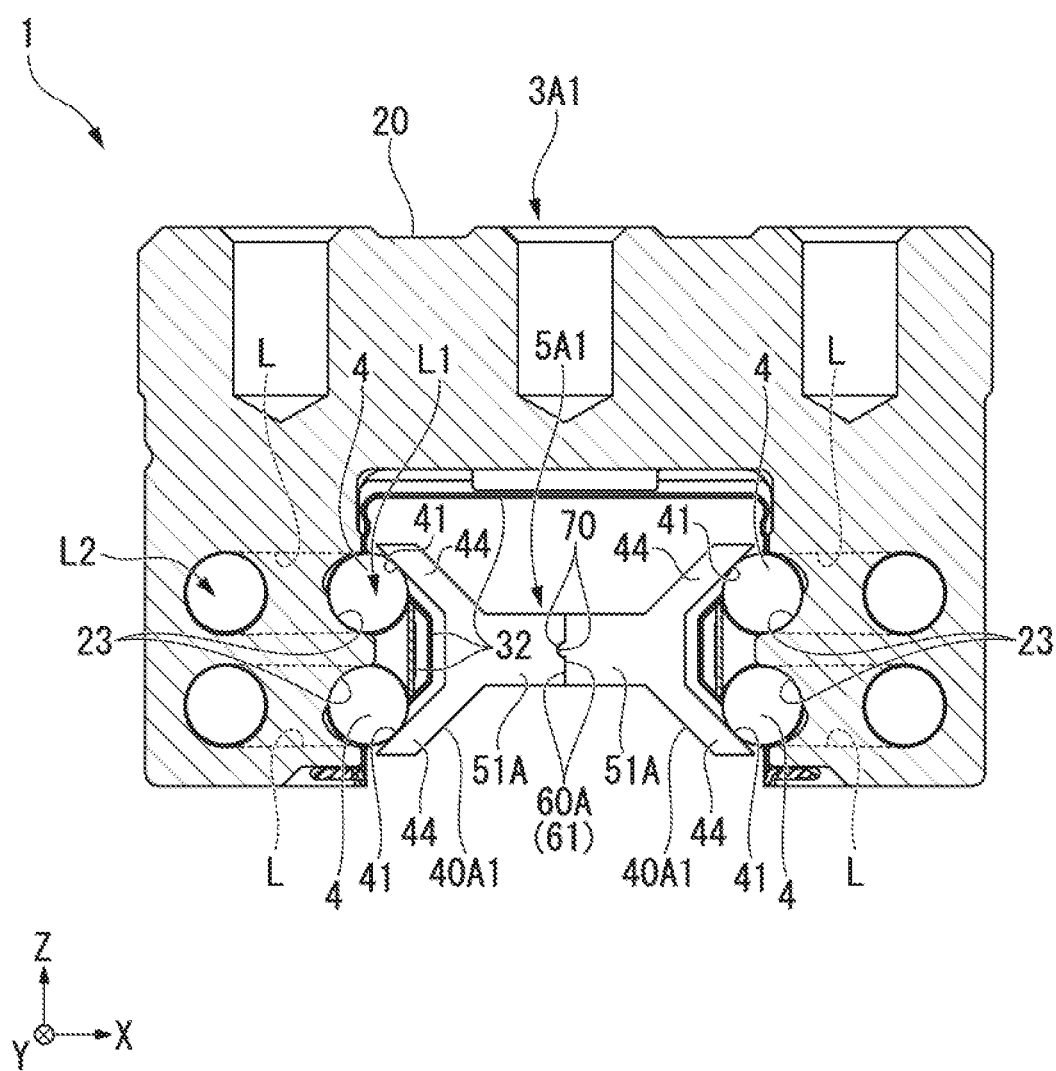
FIG. 12 is a front view showing a state in which the mobile-object-holding tool in the other aspect of the second embodiment of the present invention is mounted on a slider block.

Also, in the second embodiment, forms as illustrated in FIGS. 11 and 12 can be adopted. It should be noted that, in the following description, constituent elements that are the same as or equal to those of the above-described embodiment will be denoted by the same reference numerals and description thereof will be simplified or omitted.

FIG. 11 is a perspective view showing a mobile-object-holding tool 5A1 in another aspect of the second embodiment of the present invention. FIG. 12 is a front view showing a state in which the mobile-object-holding tool 5A1 in the other aspect of the second embodiment of the present invention is mounted on a slider block 3A1.

A contact structure of the slider block 3A1 in the other aspect illustrated in FIG. 12 is different from the above-described contact structure of the slider block 3 illustrated in FIG. 7. That is to say, the slider block 3 illustrated in FIG. 7 has a contact structure (which will be described as a DF type) that is the same as a face-to-face combination of an angular contact ball bearing, but the slider block 3A1 illustrated in FIG. 12 has a contact structure (which will be described as a DB type) that is the same as a back-to-back combination of an angular contact ball bearing. The slider block 3A1 of the DB type illustrated in FIG. 12 is different from the slider block 3 of the DF type illustrated in FIG. 7 in contact angles of balls 4 with respect to the rolling element holding surfaces 41 and the rolling element load rolling grooves 23 in the mobile-object-holding tool 5A1, but other basic structures are the same.

The mobile-object-holding tool 5A1 has a shape corresponding to the slider block 3A1 of the DB type. To be specific, as illustrated in FIG. 12, the mobile-object-holding tool 5A1 has a substantially X shape in a front view. A pair of holding parts 40A1 in the mobile-object-holding tool 5A1 have extension parts 44 which extend in an inclined direction to a position in which the pair of holding parts 40A1 face rolling element load rolling grooves 23 formed in the slider block 3A1. The extension parts 44 are formed above and below the pair of holding parts 40A1, two pairs of extension parts 44, that is, a total of four extension parts 44 are formed on the left and right thereof and the rolling element holding surfaces 41 are provided at distal end portions thereof. According to the mobile-object-holding tool 5A1 of the substantial X shape, since a thickness of a central portion can be relatively reduced, the manufacturing costs at the time of resin-molding is reduced.

On the other hand, when the thickness of the central portion of the mobile-object-holding tool 5A1 is reduced, the twisting of the pair of holding parts 40A1 is likely to occur. Thus, it is desirable to provide the above-described pair of engagement parts 70. As illustrated in FIG. 11, it is desirable that the pair of engagement parts 70 be provided at at least the first biasing linking parts 50a disposed at both end portions 40a in the longitudinal direction of the pair of holding parts 40A1 among the plurality of biasing linking part 50. According to this constitution, it is possible to improve the rigidity against the twisting of the pair of holding parts 40A1 without impairing the spring property of the biasing linking parts 50 and to reliably prevent the ball 4 from being separated from the slider block 3A1.

Third Embodiment

A third embodiment of the present invention will be described below. In the following description, constituent elements that are the same as or equal to the above-described embodiments will be denoted by the same reference numerals and description thereof will be simplified or omitted.

Figure 13:
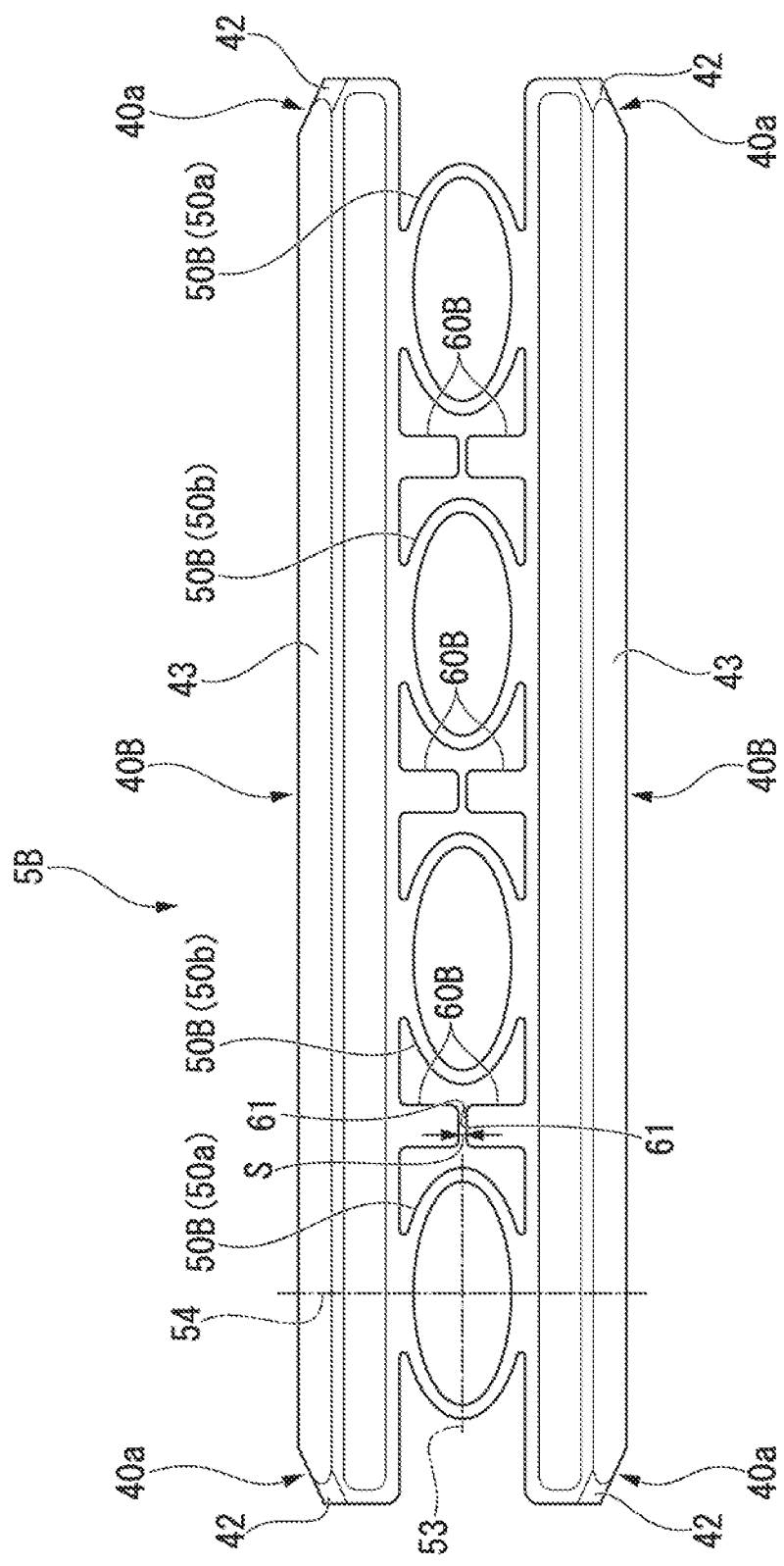
FIG. 13 is a plan view showing a mobile-object-holding tool according to a third embodiment of the present invention.
Figure 14:
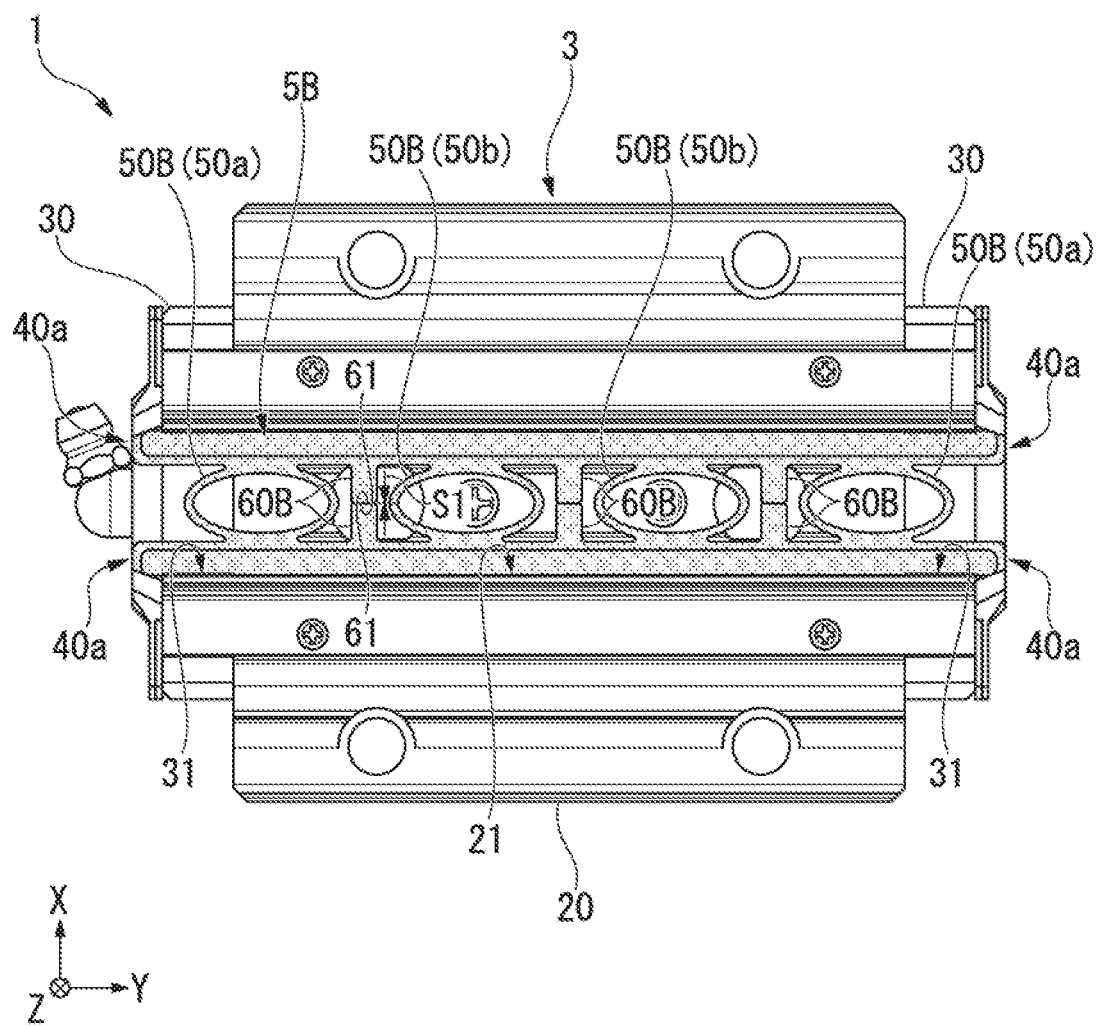
FIG. 14 is a bottom view showing a slider block having the mobile-object-holding tool mounted thereon according to the third embodiment of the present invention.

FIG. 13 is a plan view showing a mobile-object-holding tool 5B according to the third embodiment of the present invention. FIG. 14 is a bottom view showing a slider block 3 having the mobile-object-holding tool 5B mounted thereon according to the third embodiment of the present invention. It should be noted that the slider block 3 illustrated in FIG. 14 corresponds to the slider block 3 of the DF type similar to FIG. 7.

As illustrated in FIG. 13, the mobile-object-holding tool 5B in the third embodiment includes annular biasing linking parts 50B.

The biasing linking parts 50B have an elliptical shape in which long axes 53 thereof extend in the longitudinal direction of the pair of holding parts 40B and short axes 54 thereof extend in an opposite direction of the pair of holding parts 40B. The biasing linking parts 50B link the pair of holding parts 40B together at positions other than both end portions 40a of the pair of holding parts 40B. Deformation regulating parts 60B are provided between adjacent biasing linking parts 50B in the longitudinal direction of the pair of holding parts 40B. That is to say, the deformation regulating parts 60B in the third embodiment is provided at a location other than the biasing linking parts 50B. The deformation regulating parts 60B are provided to protrude toward each other from the pair of holding parts 40B. As illustrated in FIG. 14, the deformation regulating parts 60B include a pair of abutting parts 61 which come into contact with each other when mounted on the slider block 3 and regulate the contracting of the biasing linking parts SOB.

Referring back to FIG. 13, the pair of holding parts 40B include rolling element holding grooves 43 in place of the rolling element holding surfaces 41 in the above-described embodiments. The rolling element holding grooves 43 have curved surfaces corresponding to the rolling element rolling grooves 10 of the track rail 2 illustrated in FIG. 2 and are formed above and below the pair of holding parts 40B similar to the above-described rolling element holding surfaces 41 and two pairs of rolling element holding grooves 43, that is, a total of four rolling element holding grooves 43 are formed on the left and right. According to this constitution, a holding area of the balls 4 increases because the pair of holding parts 40B and balls 4 are brought into contact with each other at curved surfaces. Therefore, it is possible to more reliably prevent the ball 4 from being separated from the slider block 3.

Also, unlike the biasing linking part 50 having the above-described substantial Ω shape (a shape in which a part of a circle is broken), the biasing linking parts 50B have an annular shape. Thus, the biasing linking parts 50B are stable in a shape. Thus, a uniform spring force can be obtained in the biasing linking parts 50B. It should be noted that the biasing linking parts 50B may have a perfect circular shape, but when the biasing linking parts 50B have a perfect circular shape, the shape is too stable and a spring force increases. For this reason, the biasing linking parts 50B in the third embodiment have an elliptical shape in which the long axes 53 thereof extend in the longitudinal direction of the pair of holding parts 40B and the short axes 54 thereof extend in opposite directions of the pair of holding parts 40B. According to this constitution, it is possible to facilitate the contracting of the mobile-object-holding tool 5B inward in the width direction when inserting (mounting) the mobile-object-holding tool 5B to the slider block 3.

In addition, since the biasing linking parts 50B link the pair of holding parts 40B at positions other than both end portions 40a of the pair of holding parts 40B, when the mobile-object-holding tool 5B is inserted (mounted) to the slider block 3, it is possible to easily insert (mount) the mobile-object-holding tool 5B to the slider block 3 by bringing both end portions 40a of the pair of holding parts 40B to be close to each other.

It should be noted that a shape of the biasing linking parts 50B may be, for example, a rhombic shape as long as the long axes 53 thereof extend in the longitudinal direction of the pair of holding parts 40B and the short axes 54 thereof extend in an opposite direction to the pair of holding parts 40. However, an elliptical shape is desirable because a rhombic shape has a corner and stress is easily concentrated on the corner when the mobile-object-holding tool 5B is contracted inward in the width direction.

Figure 15:
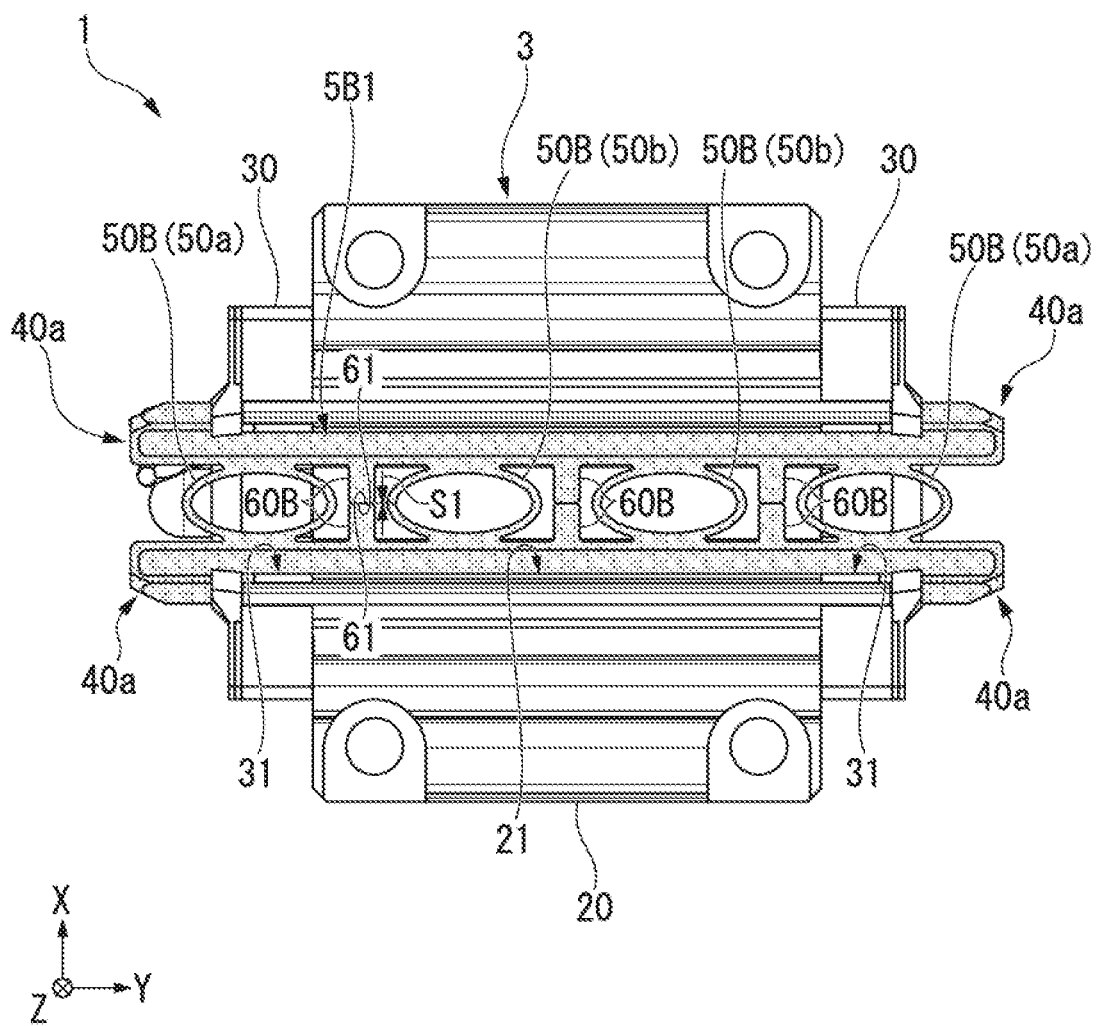
FIG. 15 is a bottom view showing a slider block having a mobile-object-holding tool mounted thereon in another aspect of the third embodiment of the present invention.

Also, the third embodiment can adopt the aspect as illustrated in FIG. 15. It should be noted that, in the following description, constituent elements that are the same as or equal to those of the above-described embodiment will be denoted by the same reference numerals and description thereof will be simplified or omitted.

FIG. 15 is a bottom view showing a slider block 3 having a mobile-object-holding tool 5B1 mounted thereon in another aspect of the third embodiment of the present invention.

A length of the mobile-object-holding tool 5B1 in the other aspect illustrated in FIG. 15 with respect to the slider block 3 is different from the length of the above-described mobile-object-holding tool 5B illustrated in FIG. 14 with respect to the slider block 3. That is to say, the mobile-object-holding tool 5B illustrated in FIG. 14 is formed to have a length which is substantially the same as the slider block 3 in the Y axis direction, but the mobile-object-holding tool 5B1 illustrated in FIG. 15 is formed to be longer than the slider block 3 in the Y axis direction. The mobile-object-holding tool 5B1 includes a plurality of elliptical biasing linking parts 50B and a first biasing linking part 50a among the plurality of biasing linking parts 50B is disposed to face an insertion port of the slider block 3, that is, both end portions of a rail accommodation part 21 in a block main body 20 or a rail accommodation part 31 in a lid body 30.

Since each of the biasing linking parts 50B has an elliptical shape, it can be said that the pair of holding parts 40B easily return to their original shape even when the pair of holding parts 40B are twisted and the pair of holding parts 40B have a robust shape against the twisting. On the other hand, the biasing linking parts 50B link the pair of holding parts 40B at positions other than both end portions 40a of the pair of holding parts 40B. Thus, in the mobile-object-holding tool 5B illustrated in FIG. 14, when the twisting occurs at both end portions 40a of the pair of holding parts 40B, the ball 4 is likely to be separated in the vicinity of the insertion port of the slider block 3. In this regard, in the mobile-object-holding tool 5B1 illustrated in FIG. 15, the biasing linking part 50B is disposed in the insertion port of the slider block 3. Thus, it is possible to prevent the ball 4 from being separated from the slider block 3 even when the twisting has occurred at both end portions 40a of the pair of holding parts 40B.

Fourth Embodiment

A fourth embodiment of the present invention will be described below. In the following description, constituent elements that are the same as or equal to the above-described embodiments will be denoted by the same reference numerals and description thereof will be simplified or omitted.

Figure 16:
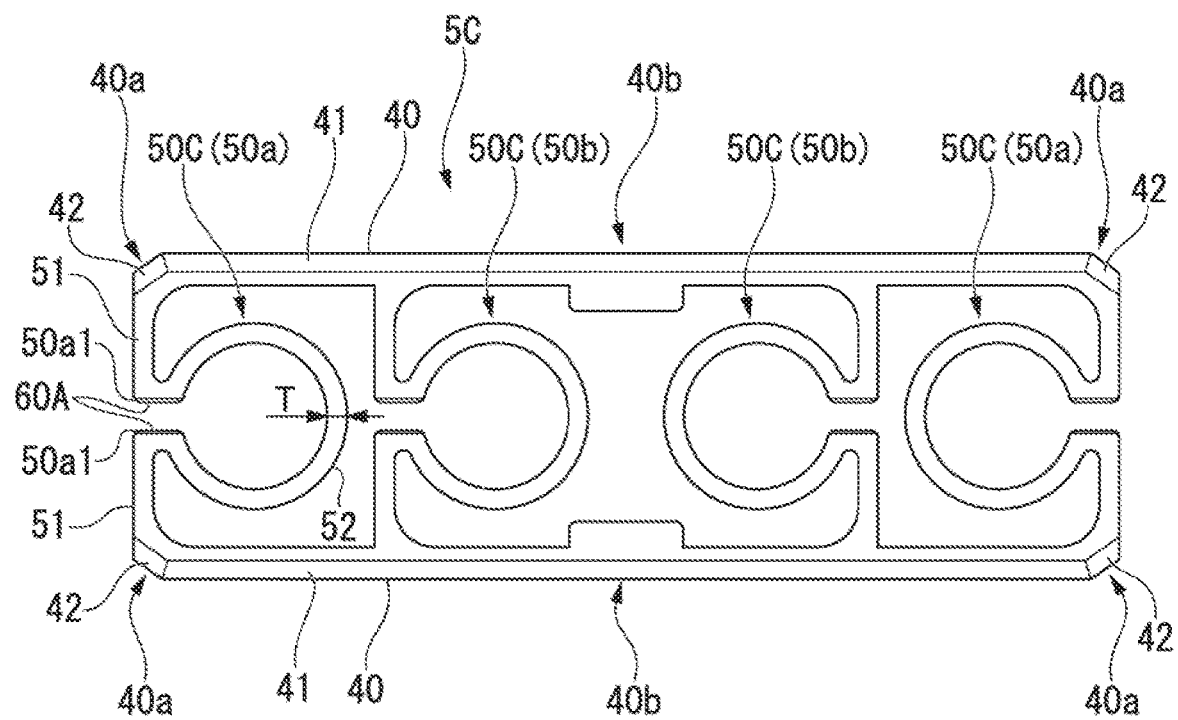
FIG. 16 is a plan view showing a mobile-object-holding tool according to a fourth embodiment of the present invention.
Figure 17:
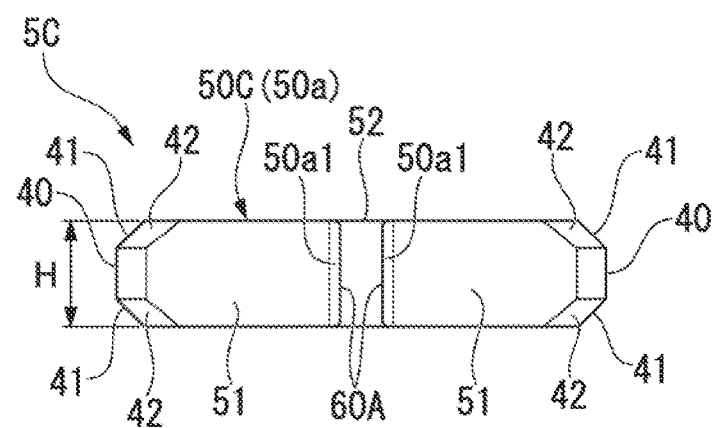
FIG. 17 is a front view showing the mobile-object-holding tool according to the fourth embodiment of the present invention.

FIG. 16 is a plan view showing a mobile-object-holding tool 5C according to the fourth embodiment of the present invention. FIG. 17 is a front view showing the mobile-object-holding tool 5C according to the fourth embodiment of the present invention.

As illustrated in FIGS. 16 and 17, the mobile-object-holding tool 5C in the fourth embodiment does not have the above-described pair of engagement parts 70 formed in the second embodiment, and has a biasing linking part 50C having an increased wall thickness instead. That is to say, in the fourth embodiment, the twisting of the pair of holding parts 40 is minimized by a spring force (rigidity) of the biasing linking part 50C. Furthermore, the mobile-object-holding tool 5C in the fourth embodiment has end surfaces of both end portions 40a in which the chamfering of facing portions (denoted by reference symbol 50a1) of the first biasing linking parts 50a is eliminated so that the pair of holding parts 40 are difficult to get caught even when the twisting of the pair of holding parts 40 occurs.

It is desirable that such a biasing linking part 50C (mobile-object-holding tool 5C) be made of a resin material including an engineering plastic such as a reinforced fiber 66 nylon (6 nylon), a polyacetal (POM), a polyamide (PA), a polycarbonate (PC), a modified polyphenylene ether (m-PPE), a polybutylene terephthalate (PBT), a GF-reinforced polyethyleneterephthalate (GF-PET), and an ultra high molecular weight polyethylene (UHPE) syndiotactic polystyrene (SPS). Furthermore, the biasing linking part 50C (mobile-object-holding tool 5C) may be formed of a resin material including a super engineering plastic such as an amorphous polyarylate (PAR), a polysulfone (PSF), a polyethersulfone (PES), a polyphenylene sulfide (PPS), a polyether ether ketone (PEEK), a polyimide (PI), a polyether imide (PEI), a fluorine resin, and a liquid crystal polymer (LCP).

The biasing linking part 50C has a thickness T illustrated in FIG. 16 which is larger than those of the above-described biasing linking parts 50 in the first embodiment and the second embodiment. It should be noted that a height H of the biasing linking part 50C illustrated in FIG. 17 is the same as those of the biasing linking parts 50 in the first embodiment and the second embodiment. T/H which is an aspect ratio of a cross section of the biasing linking part 50C when the thickness of the biasing linking part 50C is assumed to be T and the height of the biasing linking part 50C is assumed to be H satisfies a relationship of the following Expression (2):

$$10\% < T/H < 90\% \qquad (2)$$

When T/H is less than 10, the rigidity of the biasing linking part 50C decreases and thus the twisting of the pair of holding parts 40 easily occurs. On the other hand, when TH exceeds 90%, the rigidity of the biasing linking part 50C is too high and thus it is difficult to deform elastically and it is difficult to mount the biasing linking part 50C on the slider block 3.

According to the fourth embodiment of the above-described constitution, the twisting of the pair of holding parts 40 does not occur or the pair of holding parts 40 return to their original shape by the spring force (rigidity) even when the twisting of the pair of holding parts 40 occurs by increasing a thickness of the biasing linking part 50C to satisfy the relationship of Expression (2). Thus, it is possible to more reliably prevent the ball 4 from being separated in a state in which the mobile-object-holding tool 5C has been mounted on the slider block 3. Furthermore, in the fourth embodiment, it is not necessary to form the pair of engagement parts 70 through forcible extraction or the like of a metal mold as in the above-described second embodiment. Thus, the manufacturing costs of the mobile-object-holding tool 5C can be reduced.

A relationship between T/H of the biasing linking part 50C which is more desirable to that of the fourth embodiment will be described below. The following Table 2 shows T/H of the biasing linking part 50C and the presence or absence of the occurrence of the twisting of the pair of holding parts 40. It should be noted that, in Examples 1 to 6 and Comparative Examples 1 to 6 illustrated in Table 2, conditions other than T/H (for example, a resin material, a twisting load, and the like) are the same.

TABLE 2

| | | | (mm) |
| | H | T | T/H ratio | Presence and absence of twisting |
| --- | --- | --- | --- | --- |
| Example 1 | 4.5 | 1.4 | 31% | Absence |
| Example 2 | 4.8 | 1.4 | 29% | Absence |
| Example 3 | 6.0 | 1.6 | 27% | Absence |
| Example 4 | 6.5 | 1.6 | 25% | Absence |
| Example 5 | 8.0 | 2.2 | 28% | Absence |
| Example 6 | 10.0 | 2.8 | 28% | Absence |
| Comparative Example 1 | 4.5 | 1.0 | 22% | Presence |
| Comparative Example 2 | 4.8 | 1.0 | 21% | Presence |
| Comparative Example 3 | 6.0 | 1.0 | 17% | Presence |
| Comparative Example 4 | 6.5 | 1.2 | 18% | Presence |
| Comparative Example 5 | 8.0 | 1.3 | 16% | Presence |
| Comparative Example 6 | 10.0 | 2.0 | 20% | Presence |

As illustrated in Table 2, in Examples 1 to 6 of the fourth embodiment, it can be seen that the twisting of the pair of holding parts 40 does not occur. To be specific, T/H in Example 1 was 31%, T/H in Example 2 was 29%, T/H in Example 3 was 27%, T/H in Example 4 was 25%, T/H in Example 5 was 28%, and T/H in Example 6 was 28%. On the other hand, in Comparative Examples 1 to 6 in which T/H is 22% or less, it can be seen that the twisting of the pair of holding parts 40 occurs.

Therefore, it is more desirable that T/H which is an aspect ratio of a cross section of the biasing linking part 50C when the thickness of the biasing linking part 50C is assumed to be T and the height of the biasing linking part 50C is assumed to be H satisfies a relationship of the following Expression (3):

$$25\% \leq T/H \leq 31\% \quad (3)$$

While the preferred embodiments of the present invention have been described above with reference to the drawings, the present invention is not limited to the above-described embodiments. The shapes, combinations, and the like of the constituent members illustrated in the above-described embodiments are merely examples and various modifications are possible on the basis of the design requirements without departing from the gist of the present invention.

For example, the deformation regulating part 60 may not be provided on the pair of protrusion parts 51. That is to say, the deformation regulating part 60A may not be need to be provided to protrude as long as the pre-mounting contracting amount S and the mounted contraction amount S1 can be managed between the pair of protrusion parts 51A as in the second embodiment.

Also, while, for example, an aspect in which there are no pair of engagement parts 70 in the second embodiment has been described in the fourth embodiment, also in the fourth embodiment, it is possible to more reliably prevent the occurrence of the twisting of the pair of holding parts 40 by providing the pair of engagement parts 70 in the second embodiment.

Also, for example, the mobile-object-holding tool 5 is not limited to a case in which the mobile-object-holding tool 5 is integrally molded of a resin. The biasing part 52 may be formed of a plate spring and the holding parts 40 or the like made of a resin may be integrally molded with this plate spring.

Also, for example, rolling elements are not limited to the balls 4. The rolling elements may be, for example, a cylindrical roller, a barrel shape, a skew form, or the like.

Also, for example, the rolling element load rolling grooves 23 are not limited to a constitution in which two pairs of rolling element load rolling grooves 23, that is, a total of four rolling element load rolling grooves 23 are formed to sandwich the track rail 2. The rolling element load rolling grooves 23 may be formed in one pair of rolling element load rolling grooves 23, that is, a total of two rolling element load rolling grooves 23 to sandwich the track rail 2.

BRIEF DESCRIPTION OF THE REFERENCE SYMBOLS

1: Linear guide
2: Track rail (track body)
3: Slider block (mobile object)
4: Ball (rolling element)
5: Mobile-object-holding tool
10: Rolling element rolling groove
23: Rolling element load rolling groove
40: Holding part
40a: Both end portions
40b: Central portion
50: Biasing linking part
50a: First biasing linking part
51: Protrusion part
52: Biasing part
53: Long axis
54: Short axis
60: Deformation regulating part
61: Abutting part
70: Engagement part
Da: Ball diameter
H: Height
S: Pre-mounting contracting amount
S: Mounted contraction amount
T: Thickness

The invention claimed is:

1. A mobile-object-holding tool which is mounted in place of a track body on a mobile object which moves along the track body, wherein:

the mobile object includes at least a pair of rolling element load rolling grooves through which a plurality of rolling elements roll, the mobile-object-holding tool includes a pair of holding parts which face the pair of rolling element load rolling grooves and hold the plurality of rolling elements, a biasing linking part which links the pair of holding parts together and biases the pair of holding parts away from each other, and a deformation regulating part which regulates a mounted contraction amount by which the biasing linking part is capable of contracting after being mounted on the mobile object to a predetermined value or less, and the biasing linking part is formed of a resin material in which T/H which is an aspect ratio of a cross section of the biasing linking part satisfies a relationship of:

$$10\% < T/H < 90\%$$

when thickness of the biasing linking part is assumed to be T, and a height of the biasing linking part is assumed to be H.

2. The mobile-object-holding tool according to claim 1, wherein the predetermined value is a radius of the rolling element.

3. The mobile-object-holding tool according to claim 1, wherein the biasing linking part is formed of a resin material in which a relationship of:

$$25\% \leq T/H \leq 31\%$$

is satisfied.

4. The mobile-object-holding tool according to claim 1, wherein the deformation regulating part includes a pair of abutting parts which come into contact with each other when mounted on the mobile object and regulate a contracting of the biasing linking part.

5. The mobile-object-holding tool according to claim 1, wherein the biasing linking part includes a pair of protrusion parts which protrude toward each other from the pair of holding parts and a biasing part which links the pair of protrusion parts together, and the deformation regulating part is provided on the pair of protrusion parts.

6. The mobile-object-holding tool according to claim 5, wherein, when a design width of the pair of holding parts is assumed to be W, a post-installation width of the pair of holding parts after being mounted on the mobile object is assumed to be W1, a distance between protrusion parts of the pair of protrusion parts is assumed to be D, and an amount of protrusion of the deformation regulating part from the pair of protrusion parts is assumed to be P, a relationship of:

$$P = \tfrac{1}{2} \cdot (D-(W-W1))$$

is satisfied.

7. The mobile-object-holding tool according to claim 1, wherein the pair of holding parts have curved shapes that swell in directions in which central portions in a longitudinal direction thereof are separated from each other, and
  the deformation regulating part is configured to so that a larger pre-mounting contracting amount by which the biasing linking part is capable of contracting before being mounted on the mobile object is secured at the central portions than that of both end portions in the longitudinal direction of the pair of holding parts.

8. The mobile-object-holding tool according to claim 1, comprising:
  a pair of engagement parts which engage each other when mounted on the mobile object and regulate a twisting of the pair of holding parts.

9. The mobile-object-holding tool according to claim 1, wherein the biasing linking part has an elliptical shape in which a long axis thereof extends in a longitudinal direction of the pair of holding parts and a short axis thereof extends in an opposite direction to the pair of holding parts.

10. A mobile object which moves along a track body, wherein the mobile-object-holding tool according to claim 1 is mounted in place of the track body.

* * * * *